US012656722B2

(12) United States Patent
Hikita et al.

(10) Patent No.: US 12,656,722 B2
(45) Date of Patent: Jun. 16, 2026

(54) IMAGE FORMING APPARATUS

(71) Applicant: Toshiba Tec Kabushiki Kaisha, Tokyo (JP)

(72) Inventors: Haru Hikita, Mishima Shizuoka (JP); Atsushi Akiyama, Tagata Shizuoka (JP); Daisuke Yamashita, Izunokuni Shizuoka (JP); Hiroki Kinoshita, Sunto Shizuoka (JP); Ryota Matsui, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/897,754

(22) Filed: Sep. 26, 2024

(65) Prior Publication Data

US 2025/0383622 A1 Dec. 18, 2025

(30) Foreign Application Priority Data

Jun. 14, 2024 (JP) ................................ 2024-096530

(51) Int. Cl.
*G03G 15/00* (2006.01)
*G03G 21/16* (2006.01)

(52) U.S. Cl.
CPC ......... *G03G 21/16* (2013.01); *G03G 15/5016* (2013.01)

(58) Field of Classification Search
CPC ........................... G03G 15/5016; G03G 21/16
USPC ..................................................... 399/11, 18
See application file for complete search history.

(56) References Cited

U.S. PATENT DOCUMENTS

| | | | |
|---|---|---|---|
| 2010/0070216 | A1 | 3/2010 | Murata |
| 2012/0213543 | A1 | 8/2012 | Ashikawa |
| 2015/0262285 | A1 | 9/2015 | Kunihiro et al. |

FOREIGN PATENT DOCUMENTS

| | | | |
|---|---|---|---|
| JP | 2004327084 A | * 11/2004 | |
| JP | 2023140580 | * 10/2023 | |

OTHER PUBLICATIONS

Extended European Search Report dated Mar. 3, 2025 issued in EP Application No. 24202716.7, 7 pages.

* cited by examiner

*Primary Examiner* — Hoan H Tran
(74) *Attorney, Agent, or Firm* — FOLEY & LARDNER LLP

(57) ABSTRACT

Systems, methods, and apparatuses related to an image forming apparatus are provided. The image forming apparatus includes a controller and a display. The controller detects a malfunction of the image forming apparatus and calculates an amount of carbon dioxide emitted in a visit of a service engineer for maintenance work for the malfunction detected by the detection unit. The display displays the amount of carbon dioxide calculated by the controller.

19 Claims, 4 Drawing Sheets

IMAGE FORMING APPARATUS

CROSS-REFERENCE TO RELATED APPLICATION

This application is based upon and claims the benefit of priority from Japanese Patent Application No. 2024-096530, filed on Jun. 14, 2024, the entire contents of which are incorporated herein by reference.

FIELD

Embodiments described herein relate generally to an image forming apparatus.

BACKGROUND

Some malfunctions of image forming apparatuses require counteractions by service technicians and other malfunctions that can be handled by users, such as exchange of consumables or cleaning of image forming apparatuses.

In the case of malfunctions that can be handled by users, when counteractions by service technicians are requested, the users have to wait for a visit of the service technicians. Therefore, periods in which the users cannot normally use image forming apparatuses are extended, causing inconvenience. In addition, service technicians may visit unnecessarily, causing an increase in service cost. Therefore, it is important to encourage how independently users handle malfunctions.

DETAILED DESCRIPTION

In general, an exemplary embodiment provides a technique capable of promoting independent counteraction to malfunctions of an image forming apparatus by a user.

In general, according to an embodiment, an image forming apparatus includes a controller that detects a malfunction of the image forming apparatus and calculates an amount of carbon dioxide emitted in a visit of a service engineer for maintenance work for the malfunction detected by the detection unit. The apparatus incudes a display configured to display the amount of carbon dioxide calculated by the controller.

Hereinafter, embodiments will be described with reference to the drawings. The same constituent elements in each drawing will be denoted by the same reference signs and repeated description thereof will be omitted.

Configuration Example

Figure 1:
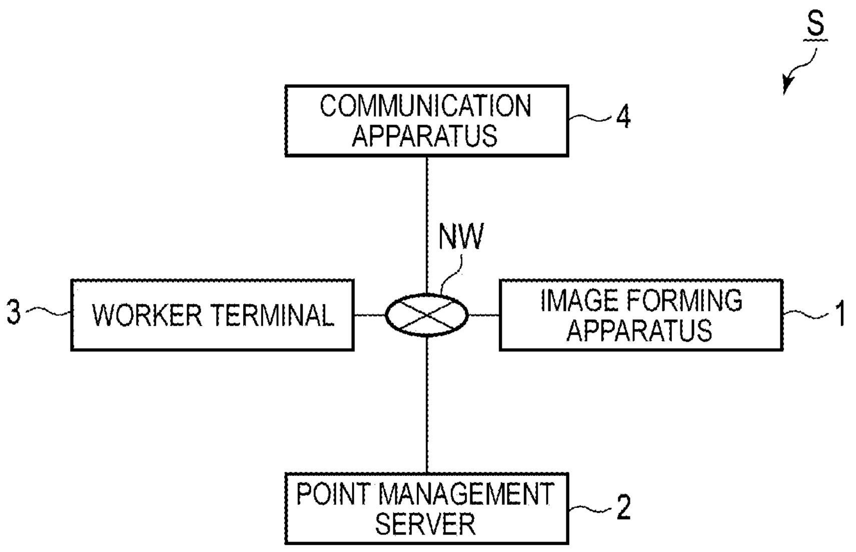
FIG. 1 is a block diagram illustrating an overview of a system including an image forming apparatus according to an embodiment.

FIG. 1 is a block diagram illustrating an example of an information processing system S according to an embodiment. The information processing system S includes an image forming apparatus 1, a point management server 2, a worker terminal 3, and a communication apparatus 4. The image forming apparatus 1, the point management server 2, the worker terminal 3, and the communication apparatus 4 are connected to be able to communicate with each other via a network NW. The network NW is realized by at least one network of the Internet, a mobile network, and a local area network (LAN). The network may include a wireless network or may include a wired network. The information processing system S is a system that includes at least two elements of the image forming apparatus 1, the point management server 2, the worker terminal 3, and the communication apparatus 4.

The image forming apparatus 1 is an electronic apparatus that has an electrographic printing function. The image forming apparatus 1 will be described as a multifunction peripheral (MFP) that has a copy function, a print function, a facsimile function, a scanner function, and the like. A configuration example of the image forming apparatus 1 will be described below.

The point management server 2 is an apparatus that collects data and processes the collected data. The apparatus includes a computer. The point management server 2 is connected to be able to communicate with the image forming apparatus 1, the worker terminal 3, and the communication apparatus 4 via a network NW. The point management server 2 receives various types of data from the image forming apparatus 1, the worker terminal 3, and the communication apparatus 4 and outputs various types of data to the image forming apparatus 1, the worker terminal 3, and the communication apparatus 4.

The point management server 2 is an apparatus that manages points of users using the image forming apparatus 1. The point management server 2 is an apparatus that manages points of the users using the plurality of image forming apparatuses 1. For example, the point management server 2 stores user information of the users using the image forming apparatus 1. The user information indicates point information of the users. The point information is a collection of point records generated for each user. The point record includes, for example, a user ID and data of a point. The user ID may be, for example, information for uniquely identifying a user. The point indicates a score that can be exchanged with a privilege. The privilege is a beneficial event awarded to a user. For example, a user can acquire a privilege in accordance with an accumulation number of points. The privilege includes, for example, a privilege for exchanging consumables, a privilege for acquiring a present, and a privilege for acquiring an application ticket to a reward. A point is an example of a privilege. Examples of data of points include data such as a point balance score, an acquisition point score, and an accumulation point score. The point balance score indicates a point score until a previous time. The acquisition point score indicates a point score to be added.

The worker terminal 3 is an apparatus capable of communicating with another apparatus (e.g., a user device). The worker terminal 3 is an apparatus used by a service engineer (e.g., a worker) who performs maintenance work. The worker terminal 3 is a personal computer (PC), a smartphone, a tablet terminal, or the like. For example, the worker terminal 3 acquires a visit request notification related to maintenance work of the image forming apparatus 1. The visit request notification may be, for example, a notification indicating that maintenance work of the image forming apparatus 1 is necessary. The maintenance work includes work such as a repair or maintenance of each unit of the image forming apparatus 1. The service engineer visits a place where the image forming apparatus 1 is installed and performs maintenance work in accordance with the visit request notification. The service engineer may input a maintenance work result to the worker terminal 3 after the maintenance work ends. The worker terminal 3 may transmit the maintenance work result of the image forming apparatus 1 to a maintenance work management server or the like.

The communication apparatus 4 is an apparatus capable of communicating with another apparatus. The communication apparatus 4 is an apparatus carried by a service engineer who performs maintenance work. The communication apparatus 4 includes a LAN interface such as Ethernet (registered trademark) and a wide area wireless communication interface such as a cellular wireless interface. The communication apparatus 4 includes a positioning device such as a Global Positioning System (GPS) module. The communication apparatus 4 acquires positional information of a service engineer from the positioning device. The positional information may be, for example, coordinate information. The communication apparatus 4 is an example of an electronic apparatus.

Figure 2:
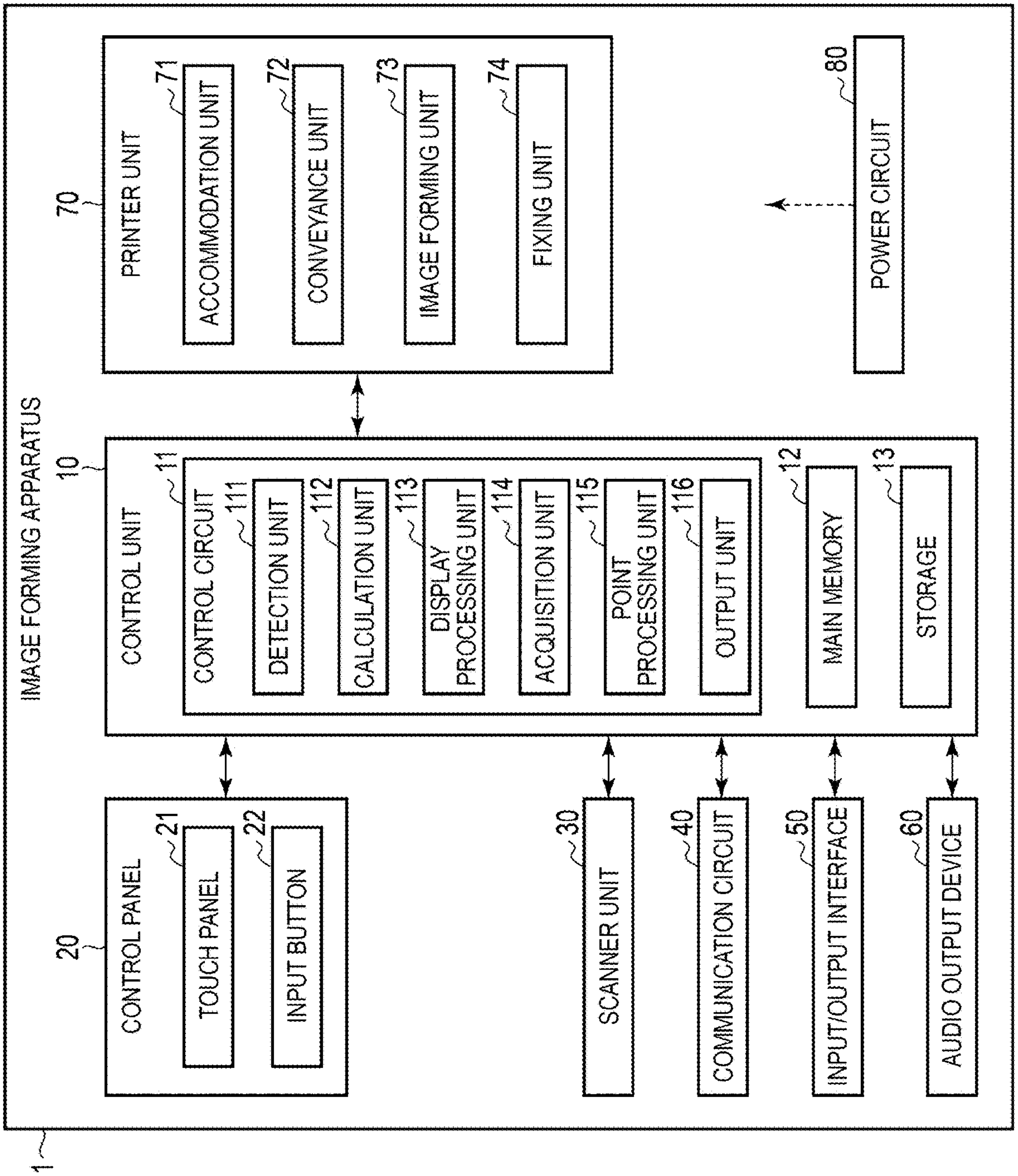
FIG. 2 is a block diagram illustrating an overview of a configuration example of the image forming apparatus.

FIG. 2 is a block diagram illustrating an overview of a configuration example of the image forming apparatus 1 according to an embodiment. The image forming apparatus 1 is an electronic apparatus that has an electrographic printing function. The image forming apparatus 1 is assumed to be an MFP that has a copy function, a print function, a facsimile function, a scanner function, and the like in description.

The image forming apparatus 1 includes a control unit 10, a control panel 20, a scanner unit 30, a communication circuit 40, an input/output interface 50, an audio output device 60, a printer unit 70, and a power circuit 80.

The control unit 10 (e.g., controller, etc.) controls an operation of each unit of the image forming apparatus 1. The control unit 10 includes a control circuit 11, a main memory 12, and a storage 13.

The control circuit 11 may be a central computing unit for the image forming apparatus 1. The control circuit 11 is an element that is included in a computer of the image forming apparatus 1. The control circuit 11 includes a processor such as a central processing unit (CPU). The control circuit 11 may include an application specific integrated circuit (ASIC), a field programmable gate array (FPGA), or a graphic processing unit (GPU) in addition to the CPU or instead of the CPU. The control circuit 11 loads a program stored in advance in the main memory 12 or the storage 13 to the main memory 12. The control circuit 11 performs various processes by executing the program loaded to the main memory 12. The program is a program that realizes each unit to be described below in the control circuit 11 and performs a process of each unit in the control circuit 11. The control circuit 11 is an example of a processing circuit.

The main memory 12 may be a main storage unit of the image forming apparatus 1. The main memory 12 is an element that is included in the computer of the image forming apparatus 1. The main memory 12 includes a nonvolatile memory area and a volatile memory area. The main memory 12 stores an operating system or a program in the nonvolatile memory area. The main memory 12 uses the volatile memory area as a work area where the control circuit 11 can appropriately rewrite data. For example, the main memory 12 includes a read only memory (ROM) as the nonvolatile memory area. For example, the main memory 12 includes a random access memory (RAM) as the volatile memory area.

The storage 13 may be an auxiliary storage unit of the image forming apparatus 1. The storage 13 is an element that is included in the computer of the image forming apparatus 1. For example, the storage 13 includes a hard disk drive (HDD). The storage 13 may include a semiconductor storage medium such as a solid state drive (SSD) in addition to the HDD or instead of the HDD. The storage 13 stores the above-described program, data that is used by the control circuit 11 to perform various processes, and data that is generated through a process of the control circuit 11. The storage 13 is an example of a storage device.

The storage 13 stores information regarding malfunctions of the image forming apparatus 1. The malfunctions include malfunctions that can be handled by users and malfunctions that cannot be handled by the users. In some embodiments, the malfunctions on which the counteraction can be performed by the users are malfunctions that can be restored when the users take counteractions. In other embodiments, the malfunctions that cannot be handled by the users are malfunctions that cannot be restored despite counteractions by the users or malfunctions which require counteractions by service engineers. Information regarding the malfunctions may be, for example, a malfunction table. The malfunction table includes types of malfunctions, counteractive measures (e.g., countermeasures), and information indicating whether the user can take counteractions. The types of malfunctions include, for example, jamming, sheet shortage, toner shortage, a sensor error, and a memory error. The types of malfunctions can be categorized according to error codes.

The counteractive measures are information indicating counteractive measures to malfunctions. The counteractive measures include counteractive measures that can be handled by the users and counteractive measures that cannot be handled by the users. The counteractive measures that can be handled by users are counteractive measures that can be handled by users by herself or himself. The counteractive measures that can be handled by the users are, for example, exchanges of toner cartridges. The counteractive measures that cannot be handled by users are counteractive measures that cannot be handled by users by herself or himself. The counteractive measures that cannot be handled by the users are, for example, maintenance work by service engineers. Whether the user can take counteractions is determined based on the information indicating whether the user can handle malfunctions from the malfunction table. For example, a case in which a malfunction is "toner shortage" will be described. The malfunction "toner shortage" is a malfunction that can be handled by a user because the user can exchange a toner cartridge to resolve the malfunction. For example, the malfunction "sensor error" is a malfunction that cannot be handled by a user since a service engineer may be required to handle the malfunction. The malfunction table is a table in which error codes, types of malfunctions, counteractive measures, and information indicating whether users can take counteractions are associated with each other. The malfunction table can be set in advance by a manager or the like of the image forming apparatus 1. The malfunction table may be updated by the manager or the like of the image forming apparatus 1.

The storage 13 stores carbon dioxide emissions per unit distance in a visit. The carbon dioxide emissions per unit distance in a visit is information indicating carbon dioxide emissions per unit distance in a visit of a service engineer. The storage 13 stores a distance in a visit based on coordinate information of an installation place of the image forming apparatus 1 and coordinate information of a service base where a service engineer who is in charge of maintenance work of the image forming apparatus 1 stays. The distance in a visit is an example of a distance between the image forming apparatus 1 and a service engineer. The distance in a visit may be, for example, a distance between the service base and the image forming apparatus 1. The distance in a visit may be a distance between a current location of a service engineer and the image forming apparatus 1. The storage 13 estimates and stores carbon dioxide emissions per unit distance in a visit in advance based on a transportation method used for a service engineer to visit. For example, when the transportation method is a specific type of commercial vehicle, the storage 13 stores carbon dioxide emissions per unit distance for the type of vehicle as the carbon dioxide emissions per unit distance in a visit. The distance in a visit may be calculated based on coordinate information of the installation place of the image forming apparatus 1 and positional information of the service engineer. The transportation method may include a plurality of transportation methods (modes). The storage 13 may store carbon dioxide emissions per unit distance in accordance with the plurality of transportation methods as the carbon dioxide emissions per unit distance in a visit.

The control panel 20 includes a touch panel 21 and an input button 22.

The touch panel 21 is a device that can display an image and can input an instruction based on a user operation on the touch panel 21 (e.g., an input interface, a user interface, etc.). The touch panel 21 includes a display device capable of displaying an image. The display device is a liquid crystal display, an organic electroluminescence (EL) display, or the like, but an exemplary embodiment is not limited thereto. The touch panel 21 includes an input device that is stacked on a display device and is capable of inputting an instruction based on a user operation on the touch panel 21. A user operation on the touch panel 21 is a user operation involving a touch on the touch panel 21. The touch panel 21 may be referred to as a touch screen.

The input button 22 is a button (e.g., a physical button, hard key, soft key or the like) such as a printing start button that can be pressed. The input button 22 is an interface capable of inputting an instruction based on a user operation on the input button 22.

The scanner unit 30 is a device that reads an image such as text, a figure, or a photo drawn on a sheet placed at a predetermined position. The scanner unit 30 includes a line sensor. The line sensor may be of a charged coupled device (CCD) type. The line sensor may be of a contact image sensor (CIS) type. The scanner unit 30 generates image data based on an image read using the line sensor. The scanner unit 30 transmits the generated image data to the control unit 10. The control unit 10 stores the received image data in the storage 13 or transmits the received image data to the printer unit 70.

The communication circuit 40 is an interface for connection so that the image forming apparatus 1 and a user terminal can communicate with each other via a wired or wireless network. For example, the user terminal is a personal computer (PC) or the like, but an exemplary embodiment is not limited thereto.

The input/output interface 50 is an interface for connecting an external apparatus and the image forming apparatus 1 to each other. The input/output interface 50 includes a connector of a wired cable.

The audio output device 60 is a device capable of outputting an audio under the control of the control circuit 11. For example, the audio output device 60 is a speaker providing an audible output.

The printer unit 70 is a unit that forms an image on a sheet. The printer unit 70 forms an image on a sheet based on image data transmitted from the user terminal via a network by a print function. The printer unit 70 forms an image on a sheet based on image data generated by the scanner unit 30 during a copy function. Here, an example of the printer unit 70 using a tandem electrophotographic toner image transfer unit will be described. The printer unit 70 includes an accommodation unit 71, a conveyance unit 72, an image forming unit 73, and a fixing unit 74.

The accommodation unit 71 accommodates a sheet. The accommodation unit 71 includes a sheet feeding cassette and a pickup roller. The sheet feeding cassette accommodates sheets. The pickup roller picks up the sheets from the sheet feeding cassette one by one. The pickup roller supplies the picked-up sheet to the conveyance unit 72.

The conveyance unit 72 conveys the sheet in the printer unit 70. The conveyance unit 72 includes a plurality of rollers and a resist roller. The plurality of rollers includes a roller that conveys the sheet supplied by the pickup roller to the resist roller. The plurality of rollers includes a roller that is provided downstream from the fixing unit 74 to be described below and discharges the sheet to a sheet discharge tray. The resist roller conveys the sheet to a transfer unit of the image forming unit 73 to be described below at a timing at which the transfer unit transfers a toner image to the sheet.

The image forming unit 73 (e.g., an image former, etc.) forms a toner image on a sheet. The image forming unit 73 includes an intermediate transfer belt, a plurality of developing units, an exposure unit, and a transfer unit. The intermediate transfer belt is an endless belt (e.g., forms a loop within the image forming unit 73). The plurality of developing units correspond to types of toner. The plurality of developing units include a black developing unit, a cyan developing unit, a magenta developing unit, and a yellow developing unit. Each developing unit includes a photosensitive drum. Each developing unit includes a charging unit, a developing device, a primary transfer roller, a cleaning unit, and a static eliminator around the photosensitive drum. The photosensitive drum is a drum that has a photosensitive layer on the surface. The charging unit uniformly charges the photosensitive layer on the surface of the photosensitive drum. The developing device develops an electrostatic latent image on the surface of the photosensitive drum. The developing device forms a toner image on the surface of the photosensitive drum. The primary transfer roller faces the photosensitive drum with the intermediate transfer belt interposed therebetween. The primary transfer roller transfers the toner image on the surface of the photosensitive drum to the intermediate transfer belt. The cleaning unit removes the toner that has not been transferred on the surface of the photosensitive drum. The static eliminator irradiates the surface of the photosensitive drum with light. The static eliminator eliminates electricity of the photosensitive layer of the photosensitive drum by photoirradiation. The exposure unit irradiates the surface of the photosensitive drum of each developing unit with laser light via an optical system such as a polygon mirror. The exposure unit forms a pattern of static electricity as an electrostatic latent image on the surface of the photosensitive drum. The transfer unit transfers the toner image charged on the surface of the intermediate transfer belt to the sheet. The transfer unit includes a support roller and a secondary transfer roller configured to interpose the intermediate transfer belt and the sheet from both sides in a thickness direction.

The fixing unit 74 (e.g., a fixer, etc.) gives heat and pressure to the sheet which is supplied from the image forming unit 73 and on which the toner image is formed. The fixing unit 74 fixes the toner image formed on the sheet to the sheet by the heat and the pressure.

The power circuit 80 converts alternating-current power supplied from a commercial power supply into direct-current power and supplies the converted direct-current power to each unit of the image forming apparatus 1. The power circuit 80 can be controlled by the control circuit 11.

A hardware configuration of the image forming apparatus 1 is not limited to the above-described configuration. In the image forming apparatus 1, the above-described constituent elements can be omitted or changed and a new constituent element can be added. The image forming apparatus 1 may not include the audio output device 60. The audio output device 60 may be connected to the image forming apparatus 1 via the input/output interface 50.

Each unit implemented by the above-described control circuit 11 will be described.

The control circuit 11 implements a detection unit 111, a calculation unit 112, a display processing unit 113, an acquisition unit 114, a point processing unit 115, and an output unit 116. Each unit implemented by the control circuit 11 can also be considered as each function. Each unit implemented by the control circuit 11 can also be implemented by control units including the control circuit 11 and the main memory 12.

The detection unit 111 detects a malfunction of the image forming apparatus 1. The detection unit 111 may acquire a notification of the malfunction from each unit of the image forming apparatus 1. For example, when a jam is detected in the printer unit 70, the printer unit 70 may notify the detection unit 111 of an error code indicating a jam. The detection unit 111 detects restoration from the malfunction of the image forming apparatus 1. The detection unit 111 may acquire the notification of the malfunction restoration from each unit of the image forming apparatus 1.

The calculation unit 112 calculates an amount of carbon dioxide emitted in a visit of a service engineer for maintenance work of a malfunction detected by the detection unit 111. The amount of carbon dioxide to be emitted is also referred to as carbon dioxide emissions. The calculation unit 112 calculates an amount of carbon dioxide emitted in a visit of a service engineer based on a distance between the image forming apparatus 1 and the service engineer and carbon dioxide emissions per unit distance by a visit method of the service engineer. The calculation unit 112 may calculate the distance between the image forming apparatus 1 and the service engineer based on positional information of a current location of the service engineer.

The display processing unit 113 (e.g., the display processor, display, the user interface, etc.) displays the carbon dioxide emissions calculated by the calculation unit 112 on the touch panel 21. The display processing unit 113 displays a message indicating whether to request a visit of the service engineer on the touch panel 21. The display processing unit 113 displays a counteractive measure to a malfunction detected by the detection unit 111 on the touch panel 21. When restoration from the malfunction detected by the detection unit 111 is detected, the display processing unit 113 displays points granted to a user on the touch panel 21.

The acquisition unit 114 acquires various instructions based on an operation of the user. The instructions include an instruction to request a visit of a service engineer. The instructions include an instruction not to request a visit of a service engineer. The instructions include an instruction indicating completion of a counteraction to a malfunction.

The point processing unit 115 performs point processing. When restoration from a malfunction is detected by the detection unit 111, the point processing unit 115 performs a process of granting points to a user. The detection of the restoration from the malfunction is an example of non-detection of a malfunction.

The output unit 116 outputs a visit request notification to the worker terminal 3 based on the acquisition of an instruction to request a visit of a service engineer. The visit request notification may include a message requesting a visit of a service engineer. The visit request notification may include image forming apparatus identification information for identifying the image forming apparatus 1 that is a maintenance work target. The image forming apparatus identification information can include, for example, a serial number, a model number, a user name, and the like of the image forming apparatus 1. In the following description, "output" may be read as "transmission."

Operation Example

Figure 3:
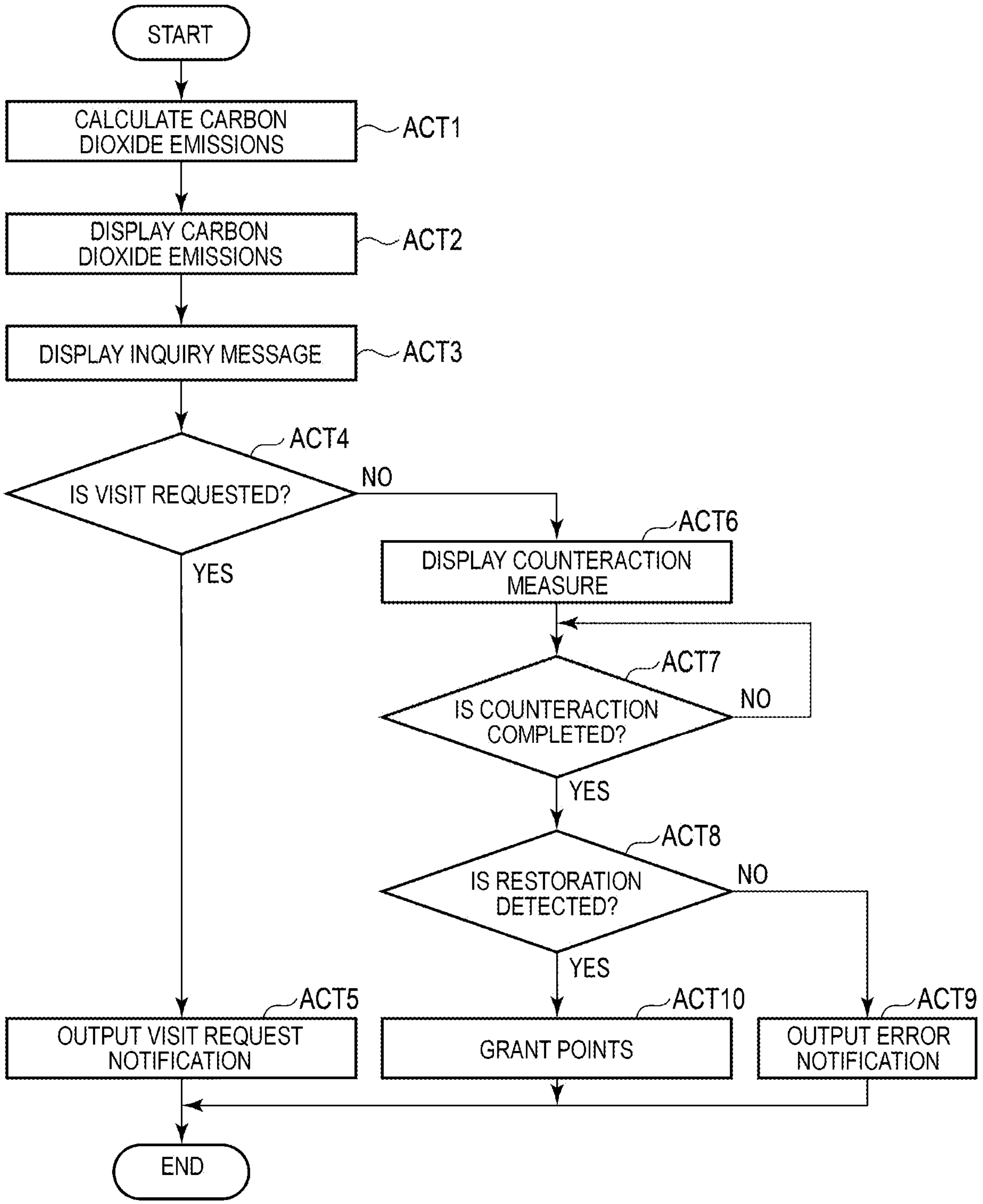
FIG. 3 is a flowchart illustrating an example of a processing procedure of information processing.

FIG. 3 is a flowchart illustrating an example of a processing procedure of information processing in the image forming apparatus 1 according to the embodiment. A processing procedure to be described below is merely exemplary and each process may be modified as necessary. In the processing procedure, each process can be omitted or replaced depending on an embodiment and a new process can also be added.

In the following process, a case in which a user uses a print function of the image forming apparatus 1 will be described. The following process starts based on detection of a malfunction occurring in the image forming apparatus 1 by the detection unit 111. The following process is assumed to start when a detected malfunction can be handled by the user.

For example, the control circuit 11 of the image forming apparatus 1 detects a malfunction occurring in the image forming apparatus 1. This process may be a process performed by the detection unit 111 implemented by the control circuit 11. The control circuit 11 may acquire, for example, an error code corresponding to a malfunction. For example, the control circuit 11 may acquire an error code from the printer unit 70 when a malfunction is jamming. Based on a malfunction table, the control circuit 11 determines whether the detected malfunction can be handled by the user. The control circuit 11 acquires information indicating whether the user can take counteraction in association with the error code. The control circuit 11 determines whether a malfunction can be handled by the user based on the information indicating whether the user can take counteraction. The control circuit 11 performs the following process based on the fact the detected malfunction can be handled by the user.

The control circuit 11 calculates carbon dioxide emissions in a visit (ACT1). The carbon dioxide emissions in a visit is an example of the carbon dioxide emissions in a visit of a service engineer for maintenance work. ACT1 may be a process by the calculation unit 112 implemented by the control circuit 11. In ACT1, for example, the control circuit 11 calculates an amount of carbon dioxide emitted when a service engineer visits an installation place of the image forming apparatus 1 to perform maintenance work of the image forming apparatus 1 in which a malfunction occurs.

The control circuit 11 calculates carbon dioxide emissions in a visit based on a distance between the image forming apparatus 1 and the service engineer and carbon dioxide emissions per unit distance by a visit method of the service engineer.

For example, the control circuit 11 calculates the distance between the image forming apparatus 1 and the service engineer based on positional information of a service base where the service engineer who is in charge of maintenance work of the image forming apparatus 1 stays. Specifically, the control circuit 11 acquires coordinate information of the installation place of the image forming apparatus 1 from the storage 13. The control circuit 11 acquires the coordinate information of the service base where the service engineer who is in charge of maintenance work of the image forming apparatus 1 stays from the storage 13. The control circuit 11 calculates a distance in a visit from the coordinate information of the installation place of the image forming apparatus 1 and the coordinate information of the service base. The control circuit 11 may store the distance in a visit in advance in the storage 13. The distance between the service base and the installation place of the image forming apparatus 1 is an example of a distance between the image forming apparatus 1 and the service engineer. The control circuit 11 calculates the carbon dioxide emissions per unit distance in a visit based on a transportation method used for the service engineer to visit. The control circuit 11 may store the carbon dioxide emissions per unit distance in a visit in advance in the storage 13.

In another example, the control circuit 11 calculates the distance between the image forming apparatus 1 and the service engineer based on the positional information of the service engineer who is in charge of maintenance work of the image forming apparatus 1. The positional information of the service engineer is positional information indicating a current location of the service engineer. Specifically, the control circuit 11 acquires the coordinate information of the installation place of the image forming apparatus 1 from the storage 13. The control circuit 11 acquires positional information of a service engineer who is in charge of maintenance work of the image forming apparatus 1 from the communication apparatus 4. The control circuit 11 calculates a distance in a visit from the coordinate information of the installation place of the image forming apparatus 1 and the coordinate information of the service engineer. The control circuit 11 may store the distance in a visit in the storage 13. A distance between the installation place of the image forming apparatus 1 and the current location of the service engineer is an example of the distance between the image forming apparatus 1 and the service engineer. The control circuit 11 calculates the carbon dioxide emissions per unit distance in a visit based on a transportation method used in the visit of the service engineer. The control circuit 11 may store the carbon dioxide emissions per unit distance in a visit in advance in the storage 13.

The control circuit 11 calculates carbon dioxide emissions in a visit by multiplying the distance in a visit and the carbon dioxide emissions per unit distance in a visit. The control circuit 11 may store the carbon dioxide emissions in a visit in the storage 13.

The control circuit 11 displays the carbon dioxide emissions in a visit on the touch panel 21 (ACT2). ACT2 may be a process performed by the display processing unit 113 implemented by the control circuit 11. In ACT2, for example, the control circuit 11 displays a carbon dioxide amount display image on the touch panel 21. The carbon dioxide amount display image includes, for example, a message indicating the carbon dioxide emissions in a visit. The message indicating the carbon dioxide emissions in a visit may be, for example, "260 g OF CARBON DIOXIDE IS EMITTED IN VISIT OF SERVICE ENGINEER" or the like.

The control circuit 11 displays an inquiry message on the touch panel 21 (ACT3). The inquiry message is an example of a message indicating whether to request a visit of a service engineer. The inquiry message may be, for example, a message for instructing whether to request a visit of a service engineer. ACT3 may be a process performed by the display processing unit 113 implemented by the control circuit 11. In ACT3, for example, the control circuit 11 displays an image including the inquiry message on the touch panel 21. The inquiry message is a message for inquiring about whether to request a visit of a service engineer. The inquiry message may be, for example, "WOULD YOU LIKE TO REQUEST VISIT?" or the like. The inquiry message may include a message indicating that a malfunction can be handled by a user. The message indicating that the malfunction can be handled by the user may be, for example, "CLIENT CAN TAKE COUNTER-ACTION" or the like. The inquiry message may include a button with which an instruction indicating whether to request a visit can be input. The control circuit 11 may display a button with which an instruction indicating whether to request a visit can be input in addition to display of the inquiry message. The buttons with which the instructions can be input are operators for instructing whether to request a visit of a service engineer. The buttons with which the instructions can be input are, for example, a "YES" button and a "NO" button. The YES" button is an operator with which an instruction to request a visit of a service engineer can be input. The "NO" button is an operator with which an instruction not to request a visit of a service engineer can be input.

The control circuit 11 may display the carbon dioxide amount display image including the inquiry message on the touch panel 21. In one example, the control circuit 11 may display a message indicting the carbon dioxide emissions in a visit and display the inquiry message on the touch panel 21. In another example, the control circuit 11 may display a message indicating the carbon dioxide emissions in a visit and then display the inquiry message on the touch panel 21.

The control circuit 11 determines whether the user requests a visit (ACT4). ACT4 may be a process performed by the acquisition unit 114 implemented by the control circuit 11. In ACT4, for example, the control circuit 11 determines whether the user operates the "YES" button. When the user operates the "YES" button, the control circuit 11 acquires an instruction to request a visit. When the instruction to request a visit is acquired, the control circuit 11 determines that the user requests a visit. When the user operates the "NO" button, the control circuit 11 acquires an instruction not to request a visit. When the instruction not to request a visit is acquired, the control circuit 11 determines that the user does not request a visit. When the user requests a visit (YES in ACT4), the process transitions from ACT4 to ACT5. When the user does not request a visit (NO in ACT4), the process transitions from ACT4 to ACT6.

When the user inputs an instruction to request a visit of a service engineer, the control circuit 11 outputs a visit request notification (ACT5). ACT5 may be a process performed by the output unit 116 implemented by the control circuit 11. In ACT5, for example, the control circuit 11 outputs the visit request notification in response to an instruction to request a visit by the user. The control circuit 11 outputs the visit request notification to the worker terminal 3 via the communication circuit 40. For example, the control circuit 11 outputs the visit request notification to the worker terminal 3 based on information for specifying the worker terminal 3 used by the service engineer stored in the storage 13. The visit request notification includes, for example, a message for requesting a visit. The message for requesting a visit may be "VISIT OF SERVICE ENGINEER IS REQUESTED" or the like. The visit request notification may include information such as an error code or image forming apparatus identification information with which the image forming apparatus 1 in which a malfunction is detected can be identified.

When the instruction not to request a visit of the service engineer is input by the user, the control circuit 11 displays a counteractive measure to the detected malfunction on the touch panel 21 (ACT6). ACT6 may be a process performed by the display processing unit 113 implemented by the control circuit 11. In ACT6, for example, the control circuit 11 displays the counteractive measure on the touch panel 21 in response to the instruction not to request a visit by the user. The instruction not to request a visit may include an error code indicating a malfunction. The control circuit 11 acquires information regarding the counteractive measure corresponding to the malfunction from the storage 13. Based on the malfunction table, the control circuit 11 acquires the information regarding the counteractive measure associated with the error code. The counteractive measure may be, for example, text information indicating the counteractive measure to the malfunction. The counteractive measure may be text information indicating an order of the counteractive measure. The control circuit 11 displays a counteractive measure display image including a message indicating the counteractive measure on the touch panel 21. The message indicating the counteractive measure may be, for example, "PLEASE EXCHANGE TONER CARTRIDGE" or the like. The counteractive measure display image may include a "counteraction completion" button indicating completion of the counteraction. The "counteraction completion" button is an operator with which an instruction indicating the completion of the counteraction to the malfunction by the user can be input. The counteractive measure may be an image, a moving image, or an audio indicating the counteractive measure to the malfunction.

The control circuit 11 determines whether the counteraction to the malfunction is completed (ACT7). ACT7 may be a process performed by the acquisition unit 114 implemented by the control circuit 11. In ACT7, for example, the control circuit 11 determines whether the user operates a "counteraction completion" button. The control circuit 11 determines that the counteraction to the malfunction is completed based on the operation on the "counteraction completion" button by the user. The control circuit 11 determines that the counteraction to the malfunction is not completed based on the non-operation on the "counteraction completion" button by the user. When the counteraction to the malfunction is completed (YES in ACT7), the process transitions from ACT7 to ACT8. When the counteraction to the malfunction is not completed (NO in ACT7), the process of ACT7 is repeated.

The control circuit 11 determines whether the restoration from the malfunction is achieved (ACT8). ACT8 may be a process performed by the detection unit 111 implemented by the control circuit 11. In ACT8, for example, the control circuit 11 detects the restoration from the malfunction. The control circuit 11 may determine whether the restoration from the malfunction is achieved based on the acquisition of a restoration notification from a portion in which the malfunction occurs. For example, when the malfunction is jamming, the control circuit 11 may acquire the restoration notification from the printer unit 70. The control circuit 11 may determine that the restoration from the malfunction is achieved based on non-detection of the malfunction by the detection unit 111. When the restoration from the malfunction is achieved (YES in ACT8), the process transitions from ACT8 to ACT10. When the restoration from the malfunction is not achieved (NO in ACT8), the process transitions from ACT8 to ACT9.

The control circuit 11 outputs an error notification when the "counteraction completion" button is input in a state where the restoration from the malfunction is not detected (ACT9). ACT9 may be a process performed by the output unit 116 implemented by the control circuit 11. In ACT9, for example, the control circuit 11 outputs the error notification to the worker terminal 3 via the communication circuit 40. The error notification includes, for example, a message indicating that the malfunction occurs. The message indicating that the malfunction occurs may be "MALFUNCTION OCCURS IN IMAGE FORMING APPARATUS A" or the like. The error notification may include information such as an error code or image forming apparatus identification information with which the image forming apparatus 1 in which the malfunction is detected can be identified.

When the malfunction is not detected, the control circuit 11 grants points to the user (ACT10). ACT10 may be a process performed by the point processing unit 115 implemented by the control circuit 11. In ACT10, for example, the control circuit 11 outputs information indicating an acquisition point score to the point management server 2 via the communication circuit 40. The acquisition point score may be a predetermined point score granted when the counteraction to the malfunction is performed. The acquisition point score may be a different point score in accordance with a type of malfunction on which the counteraction is performed. In this case, for example, the control circuit 11 may acquire the acquisition point score in accordance with a type of malfunction based on the malfunction table. The information indicating the acquisition point score may include user identification information with which the user of the image forming apparatus 1 can be identified. The user identification information may be, for example, a user ID. Based on the user ID, the point management server 2 adds the acquisition point score to a point balance score of the corresponding user. The point management server 2 may output the point information of the user to the image forming apparatus 1. The point information includes information indicating a point balance score, an acquisition point score, and an accumulation point score. The image forming apparatus 1 may acquire the point information from the point management server 2 via the communication circuit 40. Based on the point information, the image forming apparatus 1 may display a point display image on the touch panel 21. The point display image includes, for example, a message indicating the point balance score, the acquisition point score, or the accumulation point score.

The control circuit 11 may output information indicating that the user counteracts the malfunction to the point management server 2 via the communication circuit 40. The point management server 2 may calculate the acquisition point score based on the information indicating that the user counteracts the malfunction.

In ACT6, the control circuit 11 may display an image or a moving image indicating the counteractive measure on the touch panel 21 instead of or in addition to the message indicating the counteractive measure. The control circuit 11 may output an audio indicating the counteractive measure from the audio output device 60. The control circuit 11 may guide to another system indicating the counteractive measure. For example, the control circuit 11 may display link information of a website indicating the counteractive measure or the like on the touch panel 21.

In this example, the control circuit 11 detects a malfunction of the image forming apparatus 1, calculates an amount of carbon dioxide emitted in a visit of the service engineer for maintenance work of the detected malfunction, and displays the calculated amount of carbon dioxide. For example, when the malfunction is detected and the visit of the service engineer is requested to handle the malfunction, the control circuit 11 suggests the amount of carbon dioxide emitted in the visit of the service engineer to the user. The user of the image forming apparatus 1 can recognize the amount of carbon dioxide emitted in the visit of the service engineer in advance.

Therefore, based on the carbon dioxide emissions, the user can determine whether to request the visit of the service engineer. For example, it is conceivable that a user who is sensitive to a problem of emission of carbon dioxide refrains from requesting a visit of the service engineer based on the carbon dioxide emissions. Accordingly, the control circuit 11 motivates the user to perform a counteraction to the malfunction based on the carbon dioxide emissions. In this way, the image forming apparatus 1 can encourage the user to independently handle malfunctions of the image forming apparatus 1. For example, when the user can handle a malfunction of the image forming apparatus 1, the control circuit 11 can display the carbon dioxide emissions in a visit on the touch panel 21. The control circuit 11 can display a message indicating that the user can handle the malfunction on the touch panel 21. Therefore, it is conceivable that the user of the image forming apparatus 1 refrains from the request of the visit of the service engineer by recognizing the amount of carbon dioxide emitted in a request of the visit of the service engineer with respect to the malfunction that can be handled by the user. Accordingly, the control circuit 11 can motivate the user to perform a counteraction to a malfunction that can be handled by the user by herself or himself based on the carbon dioxide emissions. In this way, the image forming apparatus 1 can encourage the user to independently handle malfunctions of the image forming apparatus 1.

The control circuit 11 calculates the carbon dioxide emissions in a visit when the user can handle a malfunction of the image forming apparatus 1. Therefore, when the user cannot handle the malfunction, the control circuit 11 can omit a process of calculating the carbon dioxide emissions in a visit. The control circuit 11 can reduce a processing amount necessary for the process of calculating the carbon dioxide emissions in a visit by determining whether the user can independently handle the malfunction.

The control circuit 11 calculates an amount of carbon dioxide emitted in a visit of a service engineer based on a distance between the image forming apparatus 1 and the service engineer and the carbon dioxide emissions per unit distance by a visit method of the service engineer. For example, when the service base of the service engineer and the visit method are fixed, the amount of carbon dioxide emitted in a visit can be calculated based on the distance between the image forming apparatus 1 and the service engineer and the carbon dioxide emissions per unit distance. Therefore, the control circuit 11 can simplify the process of calculating the amount of carbon dioxide.

The control circuit 11 calculates the distance between the image forming apparatus 1 and the service engineer based on positional information of the service engineer. When the service engineer is not at the service location, for example, the service engineer visits an installation place of another image forming apparatus, the distance between the image forming apparatus 1 and the service engineer can be calculated accurately by acquiring the positional information of the service engineer. Therefore, the control circuit 11 can calculate the amount of carbon dioxide emitted in a visit more accurately. Accordingly, the control circuit 11 can motivate the user to perform a counteraction to a malfunction that can be handled by the user by herself or himself based on the carbon dioxide emissions calculated more accurately. In this way, the image forming apparatus 1 can encourage the user to independently handle malfunctions of the image forming apparatus 1. When the carbon dioxide emissions are small, for example, when a service engineer is located accidentally near an image forming apparatus in which a malfunction occurs, the user can request the service engineer to visit without hesitation.

The control circuit 11 displays a message indicating whether to request a visit of a service engineer when the amount of carbon dioxide emitted in a visit of the service engineer is displayed or after the amount of carbon dioxide emitted in a visit of the service engineer is displayed. For example, the user of the image forming apparatus 1 can instruct whether to request a visit of the service engineer either simultaneously with or after confirming that the amount of carbon dioxide emitted in a visit of the service engineer. Therefore, the user can instruct whether to request a visit of the service engineer based on the amount of carbon dioxide emitted in a visit of the service engineer. Accordingly, the control circuit 11 can motivate the user to perform a counteraction to the malfunction by herself or himself based on the carbon dioxide emissions. In this way, the image forming apparatus 1 can encourage the user to independently handle malfunctions of the image forming apparatus 1.

The control circuit 11 displays a counteractive measure to the malfunction when the user inputs an instruction not to request a visit of the service engineer. For example, the user performs the counteraction to the malfunction by herself or himself after the user inputs the instruction not to request a visit of the service engineer. When the user performs the counteraction to the malfunction by herself or himself, the control circuit 11 can provide an appropriate counteractive measure to the user by displaying the counteractive measure to the malfunction. Therefore, the control circuit 11 can support the user to perform the counteraction to the malfunction by herself or himself. In this way, the image forming apparatus 1 can encourage the user to independently handle malfunctions of the image forming apparatus 1.

When the user inputs the instruction to request a visit of the service engineer, the control circuit 11 outputs the visit request notification. The control circuit 11 can request the service engineer to visit by outputting the visit request notification to the worker terminal 3 in response to the instruction to request a visit. Therefore, the control circuit 11 can easily request a visit of the service engineer.

When a malfunction is not detected after the display of the counteractive measure, the control circuit 11 performs a process of granting points to the user. For example, when the user performs the counteraction to the malfunction by herself or himself, the control circuit 11 determines whether the restoration from the malfunction is achieved. Based on whether the restoration from the malfunction is achieved, the control circuit 11 performs the process of granting points to the user. When the user performs the counteraction to the malfunction by herself or himself and the restoration from the malfunction is achieved, the user can obtain the points. Therefore, the control circuit 11 can motivate the user to perform the counteraction to the malfunction by herself or himself. In this way, the image forming apparatus 1 can encourage the user to independently handle malfunctions of the image forming apparatus 1. The control circuit 11 performs the point processing only when the restoration from the malfunction is achieved. Therefore, the control circuit 11 can perform the point processing only when restoration from the malfunction is achieved. Accordingly, the control circuit 11 can reduce a processing amount of the point processing.

Display Example

An image displayed on the touch panel 21 of the image forming apparatus 1 will be described.

Figure 4:
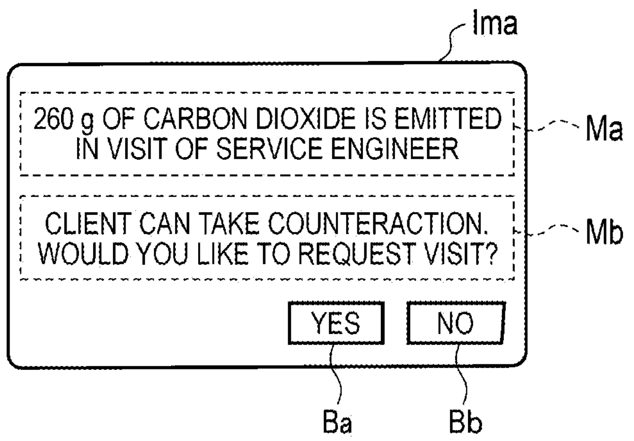
FIG. 4 is a diagram illustrating an example of a carbon dioxide amount display image displayed on a touch panel.

FIG. 4 is a diagram illustrating an example of a carbon dioxide amount display image displayed on the touch panel 21 of the image forming apparatus 1 according to an embodiment.

FIG. 4 is a diagram illustrating a carbon dioxide amount display image Ima displayed on the touch panel 21 of the image forming apparatus 1. For example, the display processing unit 113 displays the carbon dioxide amount display image Ima on the touch panel 21 when a malfunction that can be handled by a user is detected. The display processing unit 113 may display a message indicating that a malfunction occurs or a message indicating a type of malfunction on the touch panel 21, and then may display the carbon dioxide amount display image Ima on the touch panel 21. For example, the display processing unit 113 may display message such as "Jamming Occurring" and a confirmation button or the like on the touch panel 21. The display processing unit 113 may display the carbon dioxide amount display image Ima on the touch panel 21 based on an operation on the confirmation button or the like by the user.

The carbon dioxide amount display image Ima includes a carbon dioxide emission display area Ma, an inquiry message display area Mb, a "YES" button Ba, and a "NO" button Bb. The carbon dioxide emission display area Ma is an area where a message indicating carbon dioxide emissions in a visit is displayed. The message indicating carbon dioxide emissions in a visit may be, for example, "260 g OF CARBON DIOXIDE IS EMITTED IN VISIT OF SERVICE ENGINEER" or the like. Based on the message indicating carbon dioxide emissions, the user of the image forming apparatus 1 can recognize an amount of carbon dioxide emitted when a visit of the service engineer is requested to handle the malfunction.

The inquiry message display area Mb is an area where an inquiry message is displayed. The inquiry message may be, for example, "CLIENT CAN TAKE COUNTERACTION. WOULD YOU LIKE TO REQUEST VISIT?" or the like. Based on the inquiry message, the user of the image forming apparatus 1 can recognize that the user can handle the malfunction. Based on the inquiry message, the user of the image forming apparatus 1 can select whether to request a visit of the service engineer.

The "YES" button Ba is an operator with which the user can input an instruction to request a visit of the service engineer. When the user requests a visit of the service engineer, the user selects the "YES" button Ba through a touch operation or the like. Based on the touch operation of the "YES" button Ba, the control circuit 11 acquires the instruction to request a visit of the service engineer. Based on the instruction to request a visit of the service engineer, the control circuit 11 outputs a visit request notification.

The "NO" button Bb is an operator with which the user can input an instruction not to request a visit of the service engineer. When the user does not request a visit of the service engineer, the user selects the "NO" button Bb through a touch operation or the like. Based on the touch operation of the "NO" button Bb, the control circuit 11 acquires the instruction not to request a visit of the service engineer. Based on the instruction to not request a visit of the service engineer, the control circuit 11 displays a counteractive measure display image indicating a counteractive measure on the touch panel 21.

The control circuit 11 may simultaneously display the message indicating the carbon dioxide emissions in a visit and the inquiry message on the touch panel 21. The control circuit 11 may display the message indicating the carbon dioxide emissions in a visit on the touch panel 21, and then may display the inquiry message on the touch panel 21.

The control circuit 11 may output the message indicating the carbon dioxide emissions in a visit or the inquiry message by an image, a moving image, or an audio in addition to or instead of a text message. For example, the control circuit 11 may display an image or a moving image indicating the message indicating the carbon dioxide emissions in a visit or the inquiry message on the touch panel 21. The control circuit 11 may output the message indicating the carbon dioxide emissions in a visit or the inquiry message by an audio via the audio output device 60.

In this example, when a malfunction of the image forming apparatus 1 can be handled by the user, the control circuit 11 can display the carbon dioxide emissions in a visit on the touch panel 21. The user of the image forming apparatus 1 can recognize the carbon dioxide emissions emitted when a visit of the service engineer is requested to handle the malfunction. Based on the carbon dioxide emissions, the user can determine whether to request a visit of the service engineer. Therefore, the control circuit 11 can motivate the user to perform the counteraction to a malfunction by herself or himself based on the carbon dioxide emissions. Based on the carbon dioxide emissions, the user can select the counteraction to the malfunction by herself or himself to reduce the carbon dioxide emissions. In this way, the image forming apparatus 1 can encourage the user to independently handle malfunctions of the image forming apparatus 1.

Figure 5:
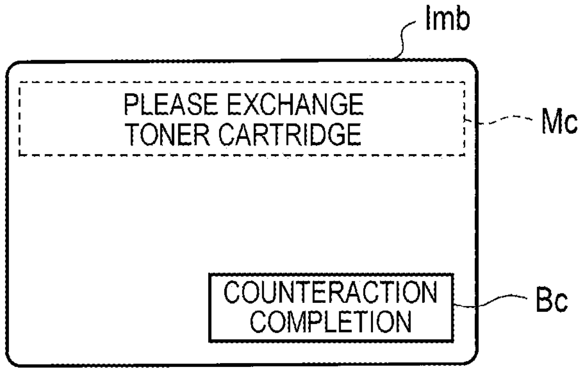
FIG. 5 is a diagram illustrating an example of a counteractive measure display image displayed on the touch panel.

FIG. 5 is a diagram illustrating an example of a counteractive measure display image displayed on the touch panel 21 of the image forming apparatus 1 according to the embodiment.

FIG. 5 is a diagram illustrating a counteractive measure display image Imb displayed on the touch panel 21 of the image forming apparatus 1. For example, the display processing unit 113 displays the counteractive measure display image Imb on the touch panel 21 based on an input of the instruction not to request a visit of the service engineer by the user. The display processing unit 113 displays the counteractive measure display image Imb on the touch panel 21 based on acquisition of the instruction not to request a visit of the service engineer.

The counteractive measure display image Imb includes a counteractive measure display area Mc and a "counteraction completion" button Bc. The counteractive measure display area Mc is an area where a message indicating a counteractive measure to a malfunction is displayed. A message indicating a counteractive measure may be, for example, "PLEASE EXCHANGE TONER CARTRIDGE" or the like. Based on the message indicating the counteractive measure, the user of the image forming apparatus 1 can handle the malfunction.

The counteraction completion" button Bc is an operator with which the user can input an instruction indicating completion of a counteraction to the malfunction. Based on the counteractive measure, the user selects the "counteraction completion" button Bc through a touch operation or the like after performing the counteraction to the malfunction. Based on a touch operation on "the counteraction completion" button Bc, the control circuit 11 determines that the counteraction to the malfunction is completed.

The control circuit 11 may output a message indicating the counteractive measure by an image, a moving image, or an audio in addition to or instead of a text message. For example, the control circuit 11 may display an image or a moving image indicating the counteractive measure on the touch panel 21. The control circuit 11 may output an audio indicating the counteractive measure via the audio output device 60.

In this example, when the user of the image forming apparatus 1 inputs the instruction not to request a visit of the service engineer, the control circuit 11 can display a message indicating the counteractive measure on the touch panel 21. The user of the image forming apparatus 1 can perform the counteraction to the malfunction by herself or himself based on the message indicating the counteractive measure. In this way, the image forming apparatus 1 can encourage the user to independently handle malfunctions of the image forming apparatus 1.

Figure 6:
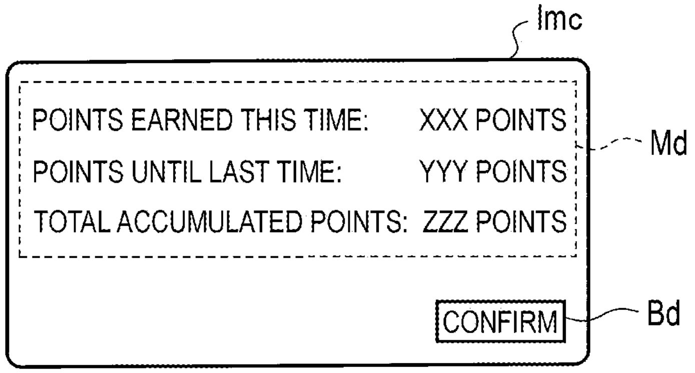
FIG. 6 is a diagram illustrating an example of a point display image displayed on the touch panel.

FIG. 6 is a diagram illustrating an example of a point display image displayed on the touch panel 21 of the image forming apparatus 1 according to the embodiment.

FIG. 6 is a diagram illustrating a point display image Imc displayed on the touch panel 21 of the image forming apparatus 1. For example, when an instruction indicating completion of the counteraction to the malfunction by the user is input and restoration from the malfunction is determined, the display processing unit 113 displays the point display image Imc on the touch panel 21. The display processing unit 113 displays the point display image Imc on the touch panel 21 based on, for example, point information of the user acquired from the point management server 2.

The point display image Imc includes a point display area Md and a "confirmation" button Bd. The point display area Md is an area where information regarding points of the user of the image forming apparatus 1 is displayed. The information regarding the points includes, for example, information indicating an acquisition point score, a point balance score, and an accumulation point score. The point display area Md includes a message regarding the points. The message regarding the points may, for example, "POINTS EARNED THIS TIME: XXX POINTS," "POINTS UNTIL LAST TIME: YYY POINTS," and "TOTAL ACCUMULATED POINTS: ZZZ POINTS" or the like. Based on the message regarding the points, the user of the image forming apparatus 1 can recognize a point score earned based on the counteraction to the malfunction and an accumulation point score.

The "confirmation" button Bd is an operator with which the user can input an instruction to hide the point display image Imc. The user selects the "confirmation" button Bd through a touch operation or the like after confirming the message regarding the points. Based on the touch operation on the "confirmation" button Bd, the control circuit 11 hides the point display image Imc.

The control circuit 11 may output the message regarding the points by an image, a moving image, or an audio in addition to or instead of text message. For example, the control circuit 11 may display an image or a moving image indicating the information regarding the points on the touch panel 21. The control circuit 11 may output an audio indicating the information regarding the points via the audio output device 60.

In this example, when the user of the image forming apparatus 1 performs the counteraction to the malfunction, the control circuit 11 can display a message indicating points granted to the user on the touch panel 21. The user of the image forming apparatus 1 can confirm the points earned when the user performs the counteraction to the malfunction by herself or himself. Therefore, based on the acquisition point score, the image forming apparatus 1 can motivate the user to perform the counteraction to the malfunction by herself or himself based on the earned point score. Accordingly, the image forming apparatus 1 can encourage the user to independently handle malfunctions of the image forming apparatus 1.

When the malfunction is not detected, the control circuit 11 can grant the points to the user and display information indicating the granting of the points on the touch panel 21. Therefore, the control circuit 11 can perform point processing responsive to restoration from the malfunction being achieved by the counteraction of the user. Accordingly, the control circuit 11 can limit a case in which the point processing is performed and reduce a processing amount of the point processing.

Modifications

In the above-described example, the image forming apparatus 1 calculates the carbon dioxide emissions in a visit based on the distance between the image forming apparatus 1 and a service engineer and the carbon dioxide emissions per unit distance in a visit, but an exemplary embodiment is not limited thereto. The image forming apparatus 1 may calculate carbon dioxide emissions in a visit using another active amount or an emission source unit. The image forming apparatus 1 may calculate carbon dioxide emissions in a visit in accordance with type of malfunction. For example, the image forming apparatus 1 may acquire distance between the image forming apparatus 1 and a service engineer in accordance with a type of malfunction and calculate the carbon dioxide emissions in a visit when a base of the service engineer is different in accordance with the type of malfunction. The image forming apparatus 1 may calculate the carbon dioxide emissions in a visit based on a power consumption or the like necessary for a counteraction to the malfunction.

In the above-described example, the image forming apparatus 1 calculates the carbon dioxide emissions in a visit when the user can handle a malfunction, but an exemplary embodiment is not limited thereto. The image forming apparatus 1 may calculate the carbon dioxide emissions in a visit whenever a malfunction is detected. In this example, the image forming apparatus 1 can omit the process of determining whether the user can handle the malfunction. Therefore, the image forming apparatus 1 can reduce a processing amount necessary for the process of determining whether the user can handle the malfunction.

Other Embodiments

In the above-described example, the image forming apparatus is given as an example in the description, but an exemplary embodiment is not limited thereto. The embodiment can be applied to an apparatus that includes at least one of a sensor, a camera, and a microphone. The embodiment can also be applied to a point of sales (POS) apparatus.

Some or all of a plurality of storage areas included in the image forming apparatus 1 may be included in a single electronic apparatus different from the image forming apparatus 1. Some or all of the plurality of storage areas included in the image forming apparatus 1 may be distributed and included in a plurality of electronic apparatuses different from the image forming apparatus 1.

The image forming apparatus 1 may be implemented with a single electronic apparatuses or may be implemented with a plurality of electronic apparatuses to which functions are distributed.

The above-described embodiment may be applied to a method executed by a system. The above-described embodiment may be applied to a program that can cause a computer of a system to execute each function. The above-described embodiment may be applied to a recording medium that stores the program.

Each of one or more circuits included in a processing circuit performs one or more processes among a plurality of processes. When the processing circuit is configured with a single circuit, the single circuit performs all of a plurality of processes. When the processing circuit is configured with a plurality of circuits, each of the plurality of circuits performs some of a plurality of processes. Some of the plurality of processes may be one of a plurality of processes or two or more of the plurality of processes. When the processing circuit is configured with a plurality of circuits, the plurality of circuits may be included in one apparatus or may be distributed to a plurality of apparatuses.

The program may be transferred in a state in which the program is stored in an electronic apparatus according to an embodiment or may be transferred in a state in which the program is not stored in an electronic apparatus. In the latter case, the program may be transferred via a network or may be transferred in a state where the program is recorded on a recording medium. The recording medium is a non-transitory tangible medium. The recording medium is a computer-readable medium. The recording medium may be a computer-readable medium capable of storing a program, such as a CD-ROM or a memory card and a specific form of the recording medium does not matter.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
- a controller, configured to:
  - detect a malfunction of the image forming apparatus; and
  - calculate an amount of carbon dioxide emitted in a visit of a service engineer for maintenance work for the malfunction; and
- a display configured to display the amount of carbon dioxide calculated by the controller.

2. The apparatus according to claim 1, wherein the controller is configured to calculate the amount of carbon dioxide emitted in the visit of the service engineer based on a distance between the image forming apparatus and the service engineer and carbon dioxide emissions per unit distance by a visit method of the service engineer.

3. The apparatus according to claim 2, wherein the controller is configured to calculate the distance between the image forming apparatus and the service engineer based on positional information of the service engineer.

4. The apparatus according to claim 1, wherein the display is configured to display a message inquiring whether to request a visit of the service engineer when the amount of carbon dioxide emitted in the visit of the service engineer is displayed.

5. The apparatus of claim 1, wherein the display is configured to display a message inquiring whether to request a visit of the service engineer after displaying the amount of carbon dioxide emitted in the visit of the service engineer.

6. The apparatus according to claim 4, wherein the controller is configured to cause the display to display a countermeasure to the malfunction responsive to a user input of an instruction not to request the visit of the service engineer.

7. The apparatus according to claim 6, wherein the controller is configured to grant a privilege to a user when no malfunction is detected after displaying the countermeasure.

8. The apparatus according to claim 1, wherein the controller is configured to:
- compare the malfunction to a malfunction table;
- determine a type of the malfunction based on the malfunction table; and
- cause the display to display the type of the malfunction.

9. The apparatus of claim 8, wherein the malfunction table comprises types of malfunctions, countermeasures, and information indicating whether a user can take the countermeasures.

10. The apparatus of claim 9, wherein the controller is configured to:
- determine that a user can take a countermeasure based on the type of the malfunction;
- determine the countermeasure for the malfunction; and
- cause the display to display the countermeasure to resolve the malfunction.

11. The apparatus of claim 1, wherein the controller is configured to output an audible message indicating a countermeasure for the malfunction.

12. A method, comprising:
- detecting a malfunction of an image forming apparatus;
- receiving a position of a service engineer relative to the image forming apparatus;
- determining a distance between the image forming apparatus and the service engineer;
- calculating an amount of carbon dioxide emitted in a visit of the service engineer for maintenance work for the malfunction; and
- displaying the amount of carbon dioxide calculated.

13. The method of claim 12, further comprising:
- displaying an inquiry whether to request the visit of the service engineer; and
- receiving a user input regarding whether to request the visit of the service engineer.

14. The method of claim 13, further comprising displaying a countermeasure responsive to receiving a user input not to request the visit of the service engineer.

15. The method of claim 14, further comprising:
- receiving a user input indicating completion of the countermeasure;

detecting that the malfunction of the image forming apparatus was resolved responsive to the user input;

determining a point score to grant to a user upon detecting that the malfunction of the image forming apparatus was resolved; and displaying the point score granted to the user.

16. The method of claim 12, further comprising:

comparing the malfunction to a malfunction table;

determining a type of the malfunction based on the malfunction table; and displaying the type of the malfunction.

17. The method of claim 16, wherein the malfunction table comprises types of malfunctions, countermeasures, and information indicating whether a user can take the countermeasures.

18. The method of claim 17, further comprising:

determining that a user can take a countermeasure based on the type of the malfunction;

determining the countermeasure for the malfunction; and causing the display to display the countermeasure to resolve the malfunction.

19. The method of claim 18, wherein the malfunction is one of a jam, a sheet shortage, a toner shortage, a sensor error, or a memory error.

* * * * *